Dec. 15, 1936. W. G. CADY 2,064,289
FREQUENCY CONTROL SYSTEM
Filed Sept. 22, 1930
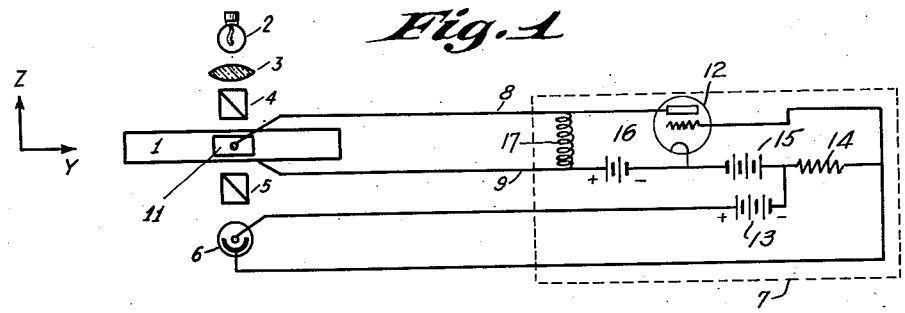
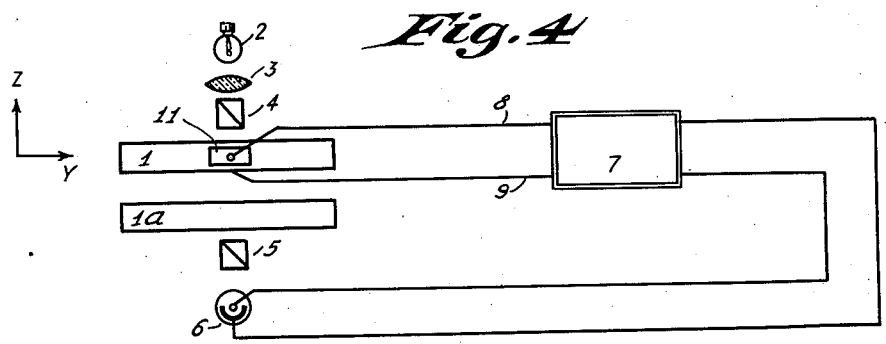
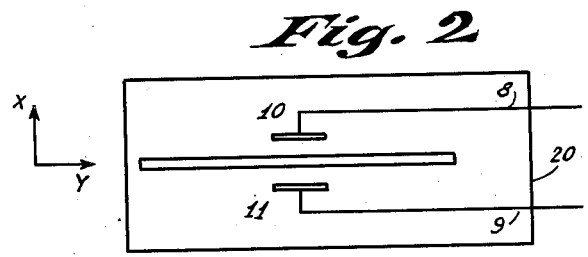
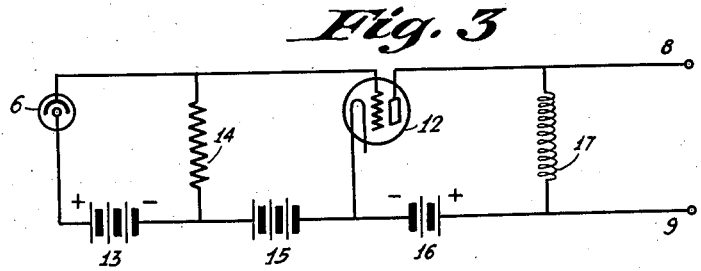
INVENTOR
WALTER G. CADY
BY
ATTORNEY Patented Dec. 15, 1936

2,064,289

UNITED STATES PATENT OFFICE 2,064,289

FREQUENCY CONTROL SYSTEM

Walter G. Cady, Middletown, Conn., assignor to Radio Corporation of America, a corporation of Delaware Application September 22, 1930, Serial No. 483,623

16 Claims. (Cl. 250—36)

This invention relates to the piezo-electric art and deals more specifically with a device designed to vibrate more faithfully at its natural period.

In most types of piezo-oscillators the vibrating crystal is so closely coupled to the electron tube circuits that it vibrates at a frequency relatively far removed from its natural frequency of vibration. Moreover, as a result of the close coupling, its actual frequency of vibration is subject to slight variations with changes in various portions of the electric circuits. This seriously interferes with its precision as a frequency standard.

The present invention has for its object the mounting of the crystal in such manner with respect to its two electrodes, that the coupling with the rest of the circuit shall be reduced to a minimum. In order that, in spite of reduced coupling, the crystal shall still exert sufficient influence on the electric circuit to control the frequency of the output current, I use a photo-electric cell as an intermediary between crystal and amplifier, and modulate the photo-electric current at crystal frequency by causing a beam of polarized light, on its way to the photo-electric cell, to pass through the crystal at a region where the variations in mechanical stress are greatest.

The manner in which the present invention is carried out will be readily understood from the following description taken in connection with the accompanying drawing in which:

Fig. 1 is a diagrammatic view of a system embodying the principles of the present invention;

Fig. 2 is a detailed view of the crystal resonator;

Fig. 3 is a detailed view of the amplifier shown in Fig. 1;

Fig. 4 is a modified form of the invention.

The arrangement of apparatus is shown in Figs. 1 and 2. 1 is the crystal plate, which is here represented (as indicated by the orientations of the X, Y and Z axes) as a so-called Curie-cut or X-cut obtained from a quartz crystal. According to the relative dimensions shown in the figure, the plate would be best adapted to vibrating in the direction of its length, at comparatively low frequency. However, there is nothing in principle to prevent applying the present method to any mode of vibration of any type of electro-mechanical vibrator which can be set into vibration by an alternating electric field, provided only that the said electro-mechanical vibrator, or a body atached to it and sharing its stresses, is sufficiently transparent for a beam of light to be passed through it, and provided that it has the optical property of causing the intensity or plane of polarization of the light to vary with its state of stress.

The beam of light coming from the source 2 passes through a converging lens 3 and two crossed Nicol prisms 4 and 5 serving respectively as polarizer and analyzer. Between the two Nicol prisms is the quartz plate 1, two of whose opposite faces must be parallel and highly polished. The direction of the beam with respect to the crystal axes is such that the state of polarization of the light will be affected to the greatest possible extent by changes in stress of the quartz. This can be determined by well-known principles of optics, and it is also clear that the beam of light must, for best results, pass through the crystal in a region where the amplitude of the changes in strain is as great as possible. For the fundamental longitudinal vibration along the length of the plate shown in Figs. 1 and 2, this region will be at the center of the plate.

After passing through Nicol prism 5, the light is received by the photo-electric cell 6, which is connected in the usual manner to the radio frequency voltage amplifier 7. One or more of the circuits associated with the amplifier may be tuned approximately to crystal frequency, but for extreme constancy of frequency it may be preferable to avoid electrical tuning. The output from 7, by means of wires 8 and 9, supplies alternating charges to the electrodes 10 and 11. These are metal plates mounted as far as possible from the crystal, at such a distance that the alternating electric field between them is just sufficient to keep the crystal in a state of vibration with enough amplitude to bring about the necessary variation in the beam of light.

Let us assume first that the light is monochromatic. The operation is then as follows: When vibrations have once been started in the plate, the stresses in the quartz cause a fluctuation in the intensity of the light received by the photo-electric cell 6. If the Nicol prisms are so crossed that no light is received by the photo-electric cell when the crystal plate is not vibrating, then when the plate vibrates, since the crystal is in a state of strain twice in each cycle of vibration, it follows that the light-impulses received by the photo-electric cell have a frequency twice that of the crystal. In order to cause the light frequency to be identical with the vibration frequency, it is only necessary to rotate one of the Nicol prisms slightly by an amount determined by trial, so that some light falls on the photo-electric cell even when the crystal is not vibrating. When the crystal is in a state of vibration, this light will wax and wane once in each cycle, thus having the same frequency as the crystal itself. It is important to note that the light received by the photo-electric cell is a maximum (or minimum) when the crystal is in a state of maximum deformation. That is, the intensity of illumination is in phase with the strain in the crystal.

Owing to the inconvenience attendant upon obtaining a sufficiently powerful source of monochromatic light, it is desirable to adopt such a design as will allow the use of ordinary white light, as from an incandescent lamp. In general, it is not feasible to use white light with the arrangement described above, because light of different wavelengths is rotated by different amounts on traversing the crystal plate. As a consequence, it is impossible to set the Nicol prisms 4 and 5, Fig. 1, in such relative positions as to make effective use of more than a narrow band of the visible spectrum. This trouble may be obviated by either of the two following optical methods as shown more clearly in Fig. 4:

First, there may be placed in the beam of polarized light, between 1 and 4 or between 1 and 5 in Fig. 1, an auxiliary crystal plate 1a of the same dimension as 1 in a direction parallel to the beam, and of the same optical properties, except that it must rotate the plane of polarization in the opposite direction from that caused by 1. For example, if plate 1 is cut from a crystal of right-handed quartz, the auxiliary plate 1a should be from left-handed quartz. The auxiliary plate must not vibrate. When plate 1 is at rest, or when in its unstrained state while vibrating, then whatever rotation of the plane of polarization is produced by 1 is exactly compensated by the auxiliary plate 1a, and this is true for all wavelengths. Hence white light may be used at the source, and the beam on reaching the Nicol 5 will be substantially the same as if both crystal plates were removed altogether. We now set 5 at an appropriate angle with 4, say 45 degrees, and find that when 1 vibrates, the periodic rotation of the plane of polarization produced by varying strains in 1 will cause the intensity of the light passed by 5 to have the same periodicity as 1, and to be much greater in amount, owing to the utilization of the whole visible spectrum, or as much thereof as is capable of affecting the photo-electric cell 6.

Second, the auxiliary plate mentioned above may be so dimensioned that the optical path through it is different from that through plate 1 by such an amount that the residual rotation of the plane of polarization for any given wavelength, after the light has traversed both plates, is approximately the same in amount as the rotation produced by the maximum strain in 1 when 1 vibrates. In this case the Nicols 4 and 5 may be crossed at 90 degrees, and the light intensity on reaching the photo-electric cell will vary with the same frequency as the vibrations of plate 1.

Consider now the phase of the output of the amplifier 7. In Fig. 3 is shown one form of amplifier in which 13, 15 and 16 are the usual batteries, 12 a thermionic amplifier tube, 17 the output impedance of the amplifier, which in Fig. 3 is represented as an inductance, and the other numerals have the same meaning as in Fig. 1. Energy derived from the output impedance 17 may be utilized in any of the ways in which the output of other piezo-oscillators is utilized. In order that the piezo-electric plate 1 shall be driven most efficiently and as closely as possible at its natural frequency, it is necessary, in accordance with well known physical principles, that the potential difference between electrodes 10 and 11, and therefore the voltage across impedance 17, shall be as nearly as possible 90° out of phase with the strain in the crystal. When we remember that the light received by the photo-electric cell, and hence the potential on the grid of tube 12, is in phase with the strain in the crystal, we see that the amplifier circuits should be so designed as to cause the potential difference across impedance 17 to be as nearly as possible in quadrature with the grid potential. From the theory of electron tube amplifiers it follows that this will be the case, with a single tube, when the output impedance is, as represented in Fig. 3, highly inductive and at the same time not too large in comparison with the resistance between anode and cathode of the electron tube 12. A further approximation to ideal phase conditions can be secured by recourse to well known methods of phase-changing, supplemented by more than one stage of amplification. The crystal is thus maintained in continuous vibration, being coupled to the amplifying system only to an extremely slight degree, owing to the relatively wide spacing of the electrodes 10 and 11.

In order to hold the temperature of the crystal constant, the crystal may be mounted as usual in a thermostatically controlled oven 20. In this case, however, two windows on opposite sides of the oven will have to be provided for the passage of the beam of light; or it is possible that a single window may be used, the light, after having passed through the crystal, being reflected back through the same window by means of a mirror placed behind the crystal. The mounting of the crystal must, of course, be such as to reduce the damping to a minimum. This involves supporting the crystal only at regions where there are nodes of motion, and also in extreme cases mounting the entire crystal in a vacuum.

Having thus described my invention, I claim:

1. In a system for generating an alternating potential of substantially constant frequency, an electron discharge device having an anode, a cathode and a control electrode, a light responsive device connected between said control electrode and said cathode, a piezo-electric crystal connected between said anode and cathode a source of light, and a lens and Nicol prism arranged between said source and crystal, said piezo-electric crystal being arranged to control, by virtue of variable amounts of light transmitted through it when in vibration, the actuation of said device from said light source.

2. A system for generating constant frequency alternating currents comprising an electron discharge device having an anode, a cathode and a control electrode, a light responsive device connected between said cathode and control electrode, a two electrode piezo-electric crystal connected between said anode and cathode, a light source and a lens and Nicol prism arranged between said source and crystal, said piezo-electric crystal being interposed between said source and said device whereby variations in potential across said piezo-electric crystal cause variations in light transmitted through said crystal and falling upon said light responsive device and hence in potentials applied to said control electrode and cathode.

3. In combination, an electron discharge device having an anode cathode circuit and a control electrode cathode circuit, a piezo-electric crystal loosely coupled to said anode cathode circuit, a light responsive device connected to said control electrode cathode circuit, a source of light for said light responsive device a lens and a Nicol prism interposed between said source and said crystal, said piezo-electric crystal being interposed between said source and said device whereby mechanical vibration of said piezo-electric crystal produces variations in light transmitted through said crystal and falling upon said device.

4. In combination, a vacuum tube oscillation generator, a piezo-electric device having a natural period of vibration loosely coupled to said generator, the degree of coupling between said device and said generator being sufficiently loose to cause the device to vibrate at its natural period substantially unaffected by changes in the electrical constants in the circuits of the said generator, a relay connected to said generator for maintaining substantially constant under control of said piezo-electric device the frequency of oscillations generated, said device being of optically active material and adapted variably to rotate the plane of polarization of a beam of light in accordance with the mechanical stresses in said device, light responsive means connected to said generator and adapted to control the frequency thereof, a light source, means to polarize and analyze the light from said source, and an auxiliary transparent crystal plate having optical rotary power equal and opposite to that of the first plate placed in series with the first plate in the path of the beam of light, said device being interposed between said polarizing and analyzing means whereby to control the amount of light passing from said source to said light responsive means.

5. In combination, a vacuum tube oscillation generator, a piezo-electric device having a natural period of vibration loosely coupled to said generator, the degree of coupling between said device and said generator being sufficiently loose to cause the device to vibrate at its natural period substantially unaffected by changes in the electrical constants in the circuits of the said generator, a relay connected to said generator for maintaining substantially constant under control of said piezo-electric device the frequency of oscillations generated, said device being of optically active material and adapted variably to rotate the plane of polarization of a beam of light in accordance with the mechanical stresses in said device, light responsive means connected to said generator and adapted to control the frequency of oscillations generated thereby, a light source, means to polarize and analyze the light from said source, and an auxiliary transparent crystal plate of such thickness as to compensate for the rotation of the plane of polarization due to the passage of the beam of polarized light through the first plate when the latter is in unstrained condition, said device being interposed between said polarizing and analyzing means whereby to control the amount of light passing from said source to said light responsive means.

6. In combination, a vacuum tube oscillation generator, a piezo-electric device having a natural period of vibration loosely coupled to said generator, the degree of coupling between said device and said generator being sufficiently loose to cause the device to vibrate at its natural period substantially unaffected by changes in the electrical constants in the circuits of the said generator, a relay connected to said generator for maintaining substantially constant under control of said piezo-electric device the frequency of oscillations generated, said device being of optically active material and adapted variably to rotate the plane of polarization of a beam of light in accordance with the mechanical stresses in said device, light responsive means connected to said generator and adapted to control the frequency thereof, a light source, means to polarize and analyze the light from said source, and an auxiliary transparent crystal plate of such thickness as to compensate for the rotation of the plane of polarization due to the passage of the beam of polarized light through the first plate when the latter is in its condition of maximum strain, said device being imposed between said polarizing and analyzing beams whereby to control the amount of light passing from said source to said light responsive means.

7. In combination, a vacuum tube oscillation generator, a piezo-electric device having a natural period of vibration loosely coupled to said generator, the degree of coupling between said device and said generator being sufficiently loose to cause the device to vibrate at its natural period substantially unaffected by changes in the electrical constants in the circuits of the said generator, a relay connected to said generator for maintaining substantially constant under control of said piezo-electric device the frequency of oscillations generated, said device being of optically active material and adapted variably to rotate the plane of polarization of a beam of light in accordance with the mechanical stresses in said device, and said device also rotating by a predetermined amount the plane of polarization of the beam of light when the device is unstrained, light responsive means connected to said generator and adapted to control the frequency thereof, a light source, means to polarize and analyze the light from said source, said device being interposed between said polarizing and analyzing means whereby to control the amount of light passing from said source to said light responsive means, and means for compensating to a predetermined extent for the rotation of the plane of polarization produced by the passage of the beam through said device when the same is unstrained.

8. A generating system for alternating currents of constant frequency comprising an electron discharge device having a pair of input electrodes and a pair of output electrodes, a piezo-electric crystal coupled to said output electrodes, a source of radiant energy, a radiant responsive device for developing electrical potentials in accordance with radiant energy impinging thereon, means including said piezo-electric crystal through which said radiant energy is transmitted for varying the amount of energy from said source impinging upon said radiant responsive device, and, means for applying the potentials developed by said radiant responsive device to the input electrodes of said electron discharge device, said developed potentials controlling the frequencies of oscillations generated by said electron discharge device.

9. The combination in a system for generating alternating currents of a piezo-electric crystal resonator capable of being stimulated electrically to vibrate mechanically, an electron discharge device for applying stimulating potentials to said piezo-electric crystal, a source of radiant energy, means for causing radiant energy from said source to be transmitted through said crystal, and, radiant responsive means responsive to the radiant energy transmitted by said piezo-electric crystal for applying control potentials to said electron discharge device which engenders said stimulating potentials.

10. A system for generating alternating currents of constant frequency comprising an electron discharge device having a pair of output electrodes and a pair of input electrodes, a piezo-electric crystal resonator coupled to said output electrodes, a source of light on one side of said piezo-electric crystal, a light responsive device on the other side of said piezo-electric crystal, responsive to light transmitted through said crystal means including said piezo-electric crystal for controlling the amount of light transmitted through said crystal and falling upon said light responsive device from said light source, an impedance coupled to said light responsive device, means for causing a current flow through said impedance in accordance with the amount of light transmitted through said crystal and falling upon said light responsive device, and, means for impressing the voltage variations arising across said impedance in response to the current flow therein upon the input electrodes of said electron discharge device.

11. A generating system for alternating currents of constant frequency comprising an electron discharge device having a pair of input electrodes and a pair of output electrodes, a piezo-electric crystal coupled to said output electrodes, a source of light energy, a lens and a Nicol prism operatively arranged between said source and said crysal, a light responsive device for developing electrical potentials in accordance with light energy impinging thereon, means including said piezo-electric crystal for varying the amount of energy from said source impinging upon said light, responsive device, and means for applying the potentials developed by said light responsive device to the input electrodes of said electron discharge device, said developed potentials controlling the frequencies of oscillations generated by said electron discharge device.

12. The combination, in a system for generating alternating currents, of a piezo-electric crystal resonator capable of being stimulated electrically to vibrate mechanically, an electron discharge device for applying stimulating potentials to said piezo-electric crystal, a source of light, a lens and a Nicol prism interposed between said source and crystal and, light responsive means, responsive to variable amounts of light transmitted through said crystal, the variation in light transmitted by said crystal being due to the mechanical vibration of said piezo-electric crystal, for applying control potentials to said electron discharge device which produces said stimulating potentials.

13. An oscillation generator comprising, in combination, a source of light rays, a photo-sensitive cell under control of said light rays, and an electrostatic light valve interposed between said source of light rays and said photo-sensitive cell, said light valve being under control of said photo-sensitive cell.

14. An oscillation generator comprising, a source of light rays, means adapted to polarize said light rays, a photo-sensitive cell under control of said polarized light rays, an output circuit for said photo-sensitive cell, and means under control of said photo-sensitive cell and adapted to rotate the plane of polarization of said light rays.

15. An oscillation generator comprising, a source of light, a photoelectric cell under control of said source of light, an output circuit for said photoelectric cell, two light polarizers interposed between said source of light and said photoelectric cell, and means adapted to revolve the plane of polarization of said light rays, said means being interposed between said light polarizers and under control of said photoelectric cell.

16. In a photo-sensitive system, a source of irradiations, photo-sensitive means under control of said irradiations, and electrostatic means under control of said photo-sensitive means for controlling said irradiations.

WALTER G. CADY.